Patented Nov. 3, 1936

2,059,459

UNITED STATES PATENT OFFICE 2,059,459

METHOD OF TREATING WELLS WITH ACIDS

Walter J. Hund, Oakland, and Albert G. Loomis, Berkeley, Calif., and Samuel Ernest Lambert, Jr., Tulsa, Okla.

No Drawing. Application June 5, 1936, Serial No. 83,698

11 Claims. (Cl. 166—21)

This invention relates to methods for increasing the production of wells, and is more specifically concerned with the treatment of oil, gas or water wells for the removal of matter obstructing the flow of fluids.

The decrease in production of oil and gas wells may be due to various causes besides actual exhaustion. The chief of these causes are: accumulation of gummy, waxy or paraffinic solid matter on the walls of the bore-hole; clogging due to the action of mud fluids used during drilling; and clogging of the pores, crevices, capillaries and flow channels of the producing formation due to the precipitation of mineral deposits from water in the well.

Various chemical treatments, such as treatments with acids, have been proposed to remove clogging matter and to increase the production of wells. Hydrochloric acid treatment is particularly effective in the case of wells sunk through limestone strata.

There are, however, disadvantages attending the use of hydrochloric acid or other similar strong aqueous acids in well treatment. Aqueous hydrochloric acid is very reactive, and has a high rate of dissolving limestone. The acid therefore becomes necessarily neutralized before it can penetrate to any great distance into the strata under treatment. The quantity of acid sufficient for adequate chemical treatment has a comparatively small volume, and it is therefore difficult to drive it deep into the formation before a partial neutralization takes place and decreases the efficiency of the process. The most vigorous reaction occurs at the face of the well-sump and in its immediate vicinity, the reaction rate decreasing with the distance from the well-face, as the acid is neutralized.

It is generally believed that the main result of acid treating is to enlarge drainage channels, thus decreasing resistance to flow of oil or gas, that is, to increase the permeability of the producing horizon in the immediate vicinity of the well. Increased production of fluid by the well is the direct result of increased permeability rather than of increased well diameter. As an example, we may cite the following data for a well recently completed. Acid treatment increased the production 85 per cent. The thickness of the producing layer was 15 feet and the average weighted porosity and solubility were 16.85 and 89 per cent, respectively, as found in the laboratory with actual cores from the formation. The treatment of the well consisted of 1000 gallons of 15% acid, and it can be shown by calculation that this quantity of acid will react with about 10 cubic feet of pure limestone. Taking into account the fact that the formation is only 89% soluble, the acid reacted with 13.5 cubic feet of the rock. If the reaction took place only in the area adjacent to the well and along the 15 feet of the producing layer, the well diameter would have increased from 6.06 to approximately 13 inches, and the percentage increase in production from this enlargement, assuming a drainage radius of 500 feet, would have been only about 11%. (See Uren, Trans. A. I. M. M. E., 1925, p. 1276.) Since the actual increase in production was 85%, it is clear that increased permeability, and not increased well diameter resulted from the treatment.

Furthermore, the permeability of limestones or dolomites is increased by the acid enlarging fractures, fissures, cracks, etc., by actual solution of limestone from the walls of such openings, as well as by the actual solution of some of the secondary deposits which cause partial clogging and hence decrease permeability. The acid also dissolves calcite crystals deposited on the walls of small solution cavities or caverns, and enlarges the interconnecting passages which may range in size from capillaries to channels. Old wells often become clogged by the deposition of "gyp" or calcium carbonate, and acid increases the permeability of such formations. In new wells, the effect of the acid is to remove the sheath deposited by the drilling mud on the walls, and also the lime fines forced into the well formation during drilling.

It is a matter of record, however, that many wells do not respond to acid treatment. Even though present methods of acid treating are inefficient in that only the pores and flow channels of the formation adjacent the well-face are enlarged, nevertheless some increase in production would be expected. It has now been discovered by microscopic examination of actual cores from wells giving negative results with acid treatment, these cores having been treated with acid in the laboratory, that one of the major causes of failure to respond to treatment is the presense of insoluble fines in the drainage openings. It has been found by permeability measurements that these acid-insoluble fines are very effective in stopping fluid flow when the flow of the spent acid solution is reversed. Chemical analysis has shown that such insoluble fines are chiefly calcium sulfate and silica. Iron hydroxide and certain gels may clog the flow channels if the acid is allowed to become completely spent before reversal.

It has further been found that this decrease in permeability caused by insoluble materials when flow is reversed towards the well may be minimized by delaying the reaction until the acid is in place in the formation away from the bore hole. If the reaction is allowed to take place at the maximum rate near the well face, as in present practice, a maximum amount of insoluble fines is carried back into the formation, causing maximum stoppage of flow channels when the flow is reversed. However, if the reaction is delayed until the acid is in place, and the flow of acid is reversed before it is entirely neutralized, the insoluble fines are swept from the formation into the well sump more easily and completely, with minimum clogging of flow channels; also, hydroxides and gels do not form.

It is therefore an object of this invention to avoid or to subdue the reaction of the acid at the face of the well during its introduction, and to control the reaction in such a way that all of the acid acts to increase formation permeability rather than merely to enlarge the hole.

The present invention consists in the treatment of clogged or partially clogged wells with two fluids, one being an aqueous fluid, and the other a non-aqueous fluid capable of forming or releasing an active acid upon dilution with water. By active acids are meant organic or inorganic acids capable of attacking or dissolving the producing formation such as dolomites, limestone, sandstone, etc.

Briefly, the process consists in separately introducing said two fluids into a well, allowing an active acid to be formed or released by dilution of the acid-containing fluid with the aqueous fluid, after a deep penetration into the formation has taken place, allowing the active acid to react with the formation, and effectively removing the obstructing matter from the pores and flow channels of the formation by reversing the flow of the treating solution before the active acid is completely neutralized by reaction with the formation.

In practicing the invention, the following procedure may be followed: The first step preferably consists in completely filling the well with oil, after which brine or fresh water is pumped down the tubing and forced into the oil formation. When the predetermined amount of water or brine has entered the formation, the tubing is cleared of water by following with a charge of oil. When the brine or water is forced into the formation as far as desired, a non-aqueous solution of an acid or of an acid-forming substance is pumped into the formation through the tubing. Upon contact with the water or brine in the formation, the acid attacks the formation, or, if an acid-forming substance is used, an acid is first formed by hydrolysis and then reacts with the formation. In some cases it may be preferable to introduce, first, the non-aqueous solution of the acid-forming reagent and to follow this by a charge of water or oil and water. It is also within the scope of the invention to introduce a series of more than two alternate charges of water and the solution.

Normally, the pressure rises considerably when introducing oil, water, and a non-aqueous acid solution into the formation. When the pressure exceeds about 500 lbs. per sq. inch, a sufficient amount of oil is bled from the casing-head to relieve the pressure. When the reaction of the acid with the formation begins, the pressure usually begins to drop, and this may serve as an indication that the non-aqueous acid solution and water are beginning to mix. The well may then be shut in and allowed to stand for about 3 hours or more, until partial neutralization of the acid results by reaction with the formation.

The reaction continues as the flow of the acid solution is reversed by pumping or swabbing, care being taken to reverse the flow of the acid before it is completely neutralized by the reaction, in order that no excessive precipitation occurs in neutralized solution, and that acid-insoluble fines be flushed out of the flow channels near the well-face. In the case of high-pressure flowing wells, it is first necessary to kill the well with oil, which is followed by filling the tubing and the casing with oil, in one of the ways known in the art. From this point the above procedure is carried out as in the case of a low-pressure well.

The following specific example of this invention as applied to an oil well may be given. A well was swabbed, bailed and cleaned out. Tubing was run in, and the well equipped to pump. After a pumping test, the standing valve was removed. Oil was pumped in the tubing until it overflowed at the casinghead. The producing formation was penetrated from 2,955 feet to 2,969 feet, and it was desired to treat from 2,961 feet to 2,966 feet (the total depth of the well being 2,969 feet). The casing (8⅝″) had been cemented at 2,920 feet, and the object of filling the well with oil was to protect the metallic parts of the equipment from the action of the acid, and also to direct the acid where desired. Oil stood in the hole to 1,968 feet, so that 55 barrels of oil were necessary to fill the tubing and the casing. Water was then pumped into the tubing followed by sufficient oil to clear the tubing of water, and to force it into the formation. A charge of 500–2000 gallons of water is usually sufficient for this purpose. A charge of 1,000 gallons of a solution of hydrogen chloride in alcohol was then pumped down the tubing and into the formation, followed by about 26 barrels of oil to clear the tubing and to force the non-aqueous acid solution into the formation.

After about 3 hours, the pumping equipment was replaced in the tubing and pumping resumed. The pump brought up oil admixed with water and alcohol, containing a considerable quantity of chlorides in solution, together with suspended insoluble fines. The net permeability of the formation was increased several fold and, as a result of this treatment, the potential of the well was raised from about 30 barrels per day by swabbing to about 200 barrels per day on the pump.

In wells in which oil and water are produced from independent strata, it may be desirable to shut off the water formation by means of a packer by methods practiced in the art, or by a chemical method of water shut-off. If water and oil are produced from the same formation, it will be necessary to diminish the amount of water introduced before the charge of the non-aqueous acid solution in order to avoid excessive dilution.

The present method is suitable for application to any clogged or partially clogged well producing oil, gas or water in any sort of terrain. It is particularly useful in treating wells in limestone or dolomitic strata, or wells sunk through limey sands, or sands with cementing material soluble in acid, or sands which have been mudded with calcareous drilling muds.

It is understood, of course, that it may be desirable to add inhibitors to prevent reaction of the acid with well equipment. There will, however, be little reaction with the tubing when the non-aqueous acid solution is being introduced (as in the case of aqueous hydrochloric acid), the reaction taking place only after dilution occurs, when the flow of the partially spent acid is reversed.

With regard to the organic and inorganic acidic or acid-forming substances which are suitable for the purposes of this invention, the following may be used: non-aqueous solutions of hydrogen chloride, hydrogen bromide, hydrogen fluoride; non-aqueous solutions of inorganic halides capable of forming active acids upon dilution with water, such as nitrosyl, thionyl or sulfuryl halides, non-aqueous solutions of organic halides such as chlorhydrins, for example, ethylene-chlorhydrin or glycerin mono- or di-chlorhydrin; chlor-sulfonic acid, chloracetic acid, non-aqueous solutions of alkyl halides, for example, the easily hydrolizable tertiary alkyl halides, such as tertiary butyl chloride, tertiary butyl hypochlorite and iso-octyl chloride; non-aqueous solutions of halogens, particularly of chlorine.

For example, chlorine introduced into a well in a non-aqueous solvent, forms, upon dilution with water, hydrochloric and hypochlorous acids, which react with the formation. Nitrosyl chloride is hydrolized to form nitrous and hydrochloric acids; thionyl chloride reacts with water to form sulfurous and hydrochloric acids, and sulfuryl chloride reacts with water to form sulfuric and hydrochloric acids. Tertiary alkyl halides, such as tertiary butyl chloride or iso-octyl chloride do not have to be dissolved in a non-aqueous solvent, and may be used alone; upon mixing with water or brine within the formation, they hydrolize to form an alcohol and hydrochloric acid; likewise, tertiary butyl hypochlorite may be used, hydrolyzing to form an alcohol and hypochlorous acid, the latter forming oxygen and hydrochloric acid in the presence of inorganic salts, such as iron salts, present in the formation.

Non-aqueous solutions of other substances besides the halogens or halides, may equally well be used for the purposes of this invention, for example, non-aqueous solutions of nitric acid or water-soluble organic sulfonic acids.

For example, nitric acid may be extracted from its aqueous solution by contacting it with ether, since its solubility therein is about fifty times greater than in water at 20° C. When the ether solution of nitric acid is introduced into the formation and mixed therein with water or brine, the acid reacts with the water-insoluble salts of the formation to give soluble nitrates, the ether solution acting as a continuous supply of nitric acid until the reaction is completed.

With regard to the non-aqueous solvents to be used as carriers for the acids or acid-forming substances in practicing the present invention, any non-aqueous solvent is satisfactory, provided that such solvent does not react destructively or irreversibly with the acid or acid-forming substance or with water and brine, and provided that the solubility of the acid or acid-forming substance in said non-aqueous solvent is sufficiently great to make the process economically feasible. The following solvents have been found especially suitable: hydrocarbons and hydrocarbon mixtures, such as petroleum and coal-tar distillates; alcohols, such as methanol, ethanol, propanol, butanols and amyl alcohols, glycols, glycerols, ethers, such as ethyl ether, ketones, liquid hydrocarbon derivatives, such as carbon disulfide, carbon tetrachloride, propylene dichloride, chlor- and bromethanes and halogenoethylenes. The selection of any particular solvent depends on the particular conditions of the case, and on the solubility in it of the desired acid or acid-forming substance. The use of alcohols as non-aqueous solvents is especially advantageous since the calcium chloride contained in the treating solution after the reaction has taken place tends to make this solution viscous, and the alcohol, by reducing the viscosity and the surface tension of said solution, facilitates its withdrawal from the formation when the flow is reversed.

The term non-aqueous solution, as used in this application is intended to cover both solutions containing substantially no water, and solutions containing water in quantities insufficient to produce an effective formation or release of the active acid to cause a vigorous reaction with the formation. Thus, when treating, for example, a limestone formation with hydrogen chloride dissolved in ethanol, it was found that even when the ethanol contained up to 25% of water, the reaction of the treating solution with the formation proceeded at a rate from 4 to 50 times slower than when the treating solution was fully diluted with water (up to 70% water). In general, solutions including up to 15% of water are therefore included in the term of non-aqueous solutions.

Thus, for example, at 20° C. and one atmosphere total pressure, the solubility of anhydrous hydrogen chloride in several solvents is as follows:

| Solvent | Solubility (in gms./ HCl per gram of solution) |
|---|---|
| Methanol | 0.464 |
| Ethanol | 0.410 |
| Ethyl ether | 0.249 |

In the case of ethyl ether there is partial miscibility with water, and the hydrogen chloride is divided between the aqueous and non-aqueous layers according to the partition law; however, as fast as the hydrogen ion in the aqueous layer is exhausted, more of the hydrogen halide passes from the non-aqueous to the aqueous layer and the reaction proceeds.

The following examples show the results of treating typical oil well cores according to this invention. A sample of core limestone taken from an oil well was treated with an anhydrous solution of hydrogen chloride in methanol and the rate of reaction for increasing percentages of water was measured by the loss of weight of the sample. The data are summarized in the following table:

Rate of Solution of a Limestone Core in Methanol Saturated with Hydrogen Chloride when Mixed with Various Percentages of Water Temperature 20° C. atmospheric pressure

| $H_2O$ | Saturated solution of $CH_3OH+HCl$ | Loss of weight of sample in 5 min. |
|---|---|---|
| Per cent | Per cent | Per cent |
| 0 | 100 | 0.10 |
| 10 | 90 | 0.42 |
| 20 | 80 | 0.75 |
| 30 | 70 | 1.10 |
| 40 | 60 | 1.40 |
| 50 | 50 | 1.74 |
| 60 | 40 | 2.55 |
| 70 | 30 | 3.70 |

Similar data were obtained for another sample of a limestone core when treated with a saturated solution of hydrogen chloride in ethanol and with various amounts of water added. The data are summarized in the following table:

Rate of Solution of a Limestone Core in Ethanol Saturated with Hydrogen Chloride when Mixed with Varying Percentages of Water Temperature 20° C. atmospheric pressure

| $H_2O$ | Saturated solution of $C_2H_5OH+HCl$ | Loss in weight of sample in 5 min. |
|---|---|---|
| Per cent | Per cent | Per cent |
| 0 | 100 | 0.02 |
| 25 | 75 | 0.13 |
| 35 | 65 | 0.55 |
| 40 | 60 | 0.96 |
| 50 | 50 | 2.45 |
| 60 | 40 | 5.30 |
| 70 | 30 | 7.60 |

In each of the above treatments with methanol and ethanol solutions of hydrogen chloride, the relative permeability of the sample was increased approximately one to ten times by using the more reactive solutions.

The effect of the delayed action of the acid on the formation was investigated by microscopic examination of their sections from a core. It was shown clearly that delayed action of the acid, that is, a reaction proceeding as the flow is reversed, was much more effective in clearing the flow channels of insoluble fines, with resultant greater permeability, than in the case where aqueous hydrochloric acid treatment was used.

We claim as our invention:

1. In the process for increasing the production of wells, the steps of separately introducing into the producing formation an aqueous fluid and a substantially non-aqueous fluid forming upon dilution with water an active acid capable of reacting with the formation, causing the two fluids to intermingle within the formation, and allowing the active acid formed to react with the formation.

2. In the process for increasing the production of wells, the steps of separately introducing into the producing formation an aqueous fluid and a solution in a substantially non-aqueous solvent of a substance forming upon dilution with water an active acid capable of reacting with the formation, causing the aqueous fluid and the solution to intermingle within the formation, and allowing the active acid formed to react with the formation.

3. In the process for increasing the production of wells, the steps of introducing into the producing formation first an aqueous fluid and then a substantially non-aqueous fluid forming upon dilution with water an active acid capable of reacting with the formation, causing the two fluids to intermingle within the formation, and allowing the active acid formed thereby to react with the formation.

4. In the process for increasing the production of wells, the steps of introducing into the producing formation first an aqueous fluid and then a substantially non-aqueous fluid forming upon dilution with water an active acid capable of reacting with the formation, causing the two fluids to intermingle within the formation, allowing the active acid formed thereby to react with the formation, and withdrawing the treating fluid before the active acid is completely neutralized by reaction with the formation.

5. In the process for increasing the production of wells, the steps of introducing into the producing formation first a substantially non-aqueous liquid forming upon dilution with water an active acid capable of reacting with the formation, and then an aqueous fluid, causing the two fluids to intermingle within the formation, and allowing the active acid formed to react with the formation.

6. In the process of claim 1, using as an acid forming fluid a solution in a non-aqueous solvent of a substantially anhydrous substance selected from the group consisting of: halogens, hydrogen halides, substituted and non-substituted halides capable of forming an acid upon dilution with water; halogen-containing inorganic substances capable of forming an acid upon dilution with water, nitric acid and water soluble sulfonic acids.

7. In the process of claim 2, using as a non-aqueous solvent a liquid substance selected from the group comprising: liquid hydrocarbons, alcohols, glycols, glycerols, ethers, ketones and their substituted derivatives.

8. In the process for increasing the production of wells the steps of separately introducing into the producing formation an aqueous fluid and a substantially non-aqueous solution of hydrogen chloride in an alcohol, causing the fluid and the solution to intermingle within the formation, and allowing the hydrochloric acid formed thereby to react with the formation.

9. In the process for increasing the production of wells the steps of separately introducing into the producing formation an aqueous fluid and a solution of substantially anhydrous non-ionized nitric acid in ether, causing the solution to intermingle within the formation with the aqueous fluid thereby ionizing the nitric acid, and allowing the ionized nitric acid to react with the formation.

10. In the process for increasing the production of wells the steps of separately introducing into the producing formation an aqueous fluid and tertiary butyl chloride, causing the latter to intermingle within the formation with the aqueous fluid thereby hydrolyzing the tertiary butyl chloride to form an alcohol and hydrochloric acid, and allowing the hydrochloric acid formed to react with the formation.

11. In the process of treating wells wherein oil and water are produced from the same formation, the steps of introducing into said formation a substantially non-aqueous fluid forming upon dilution with water an active acid capable of reacting with the formation, causing said fluid to intermingle with the formation water, and allowing the active acid formed to react with the formation.

WALTER J. HUND.
ALBERT G. LOOMIS.
SAMUEL ERNEST LAMBERT, Jr.